June 17, 1958    R. LUSSER    2,838,851
DEVICE FOR DEMONSTRATING MATHEMATICAL PROBABILITY
Filed Jan. 26, 1954

INVENTOR
ROBERT LUSSER

BY
ATTORNEYS

2,838,851

DEVICE FOR DEMONSTRATING MATHEMATICAL PROBABILITY

Robert Lusser, South Pasadena, Calif.

Application January 26, 1954, Serial No. 406,375

10 Claims. (Cl. 35—30)

(Granted under Title 35, U. S. Code (1952), sec. 266)

The invention described herein may be manufactured and used by or for the Government of the United States of America for governmental purposes without the payment of any royalties thereon or therefor.

This invention relates to novel devices for demonstrating mathematical probability, and more particularly concerns novel apparatus adapted to demonstrate the reliability problems encountered in complex automatic systems such as guided missiles.

In studying the probability of success or failure of a complex automatic system composed of a number of cooperating components, the need has developed for a device to demonstrate the meaning of the basic formula for probability that $n$ independent events, having the probability of occurence $p_1, p_2, p_3 \ldots$, etc. will occur at the same instant according to the equation $$P_{\text{over-all}} = p_1 \cdot p_2 \cdot p_3 \ldots p_i \ldots p_n$$

Such a demonstration is particularly useful for the understanding of the reliability problem of complex automatic systems such as guided missiles. All of the $n$ components of a guided missile must operate successfully at substantially the same time during its relatively short period of operation if the missile is to achieve its mission. If the reliabilities of the various individual components of the missile are $p_1, p_2, p_3, \ldots p_n$, the over-all reliability of the missile type is obtained by the product of all the individual reliabilities according to the above expression.

One object of the invention is the provision of a device for demonstrating mathematical probability.

Another object is to provide apparatus for readily demonstrating the probability of success or failure of a complex automatic system such as a guided missile, composed of a large number of mutually cooperating components each having a known reliability.

A further aim of the invention is to afford a simple, inexpensive and comparatively rugged device for demonstrating the reliability of a complex automatic system made up of mechanical, electrical and/or electronic components.

Other objects and many of the attendant advantages of this invention will be readily appreciated as the same becomes better understood by reference to the following detailed description when considered in connection with the accompanying drawing wherein.

Figure 1:
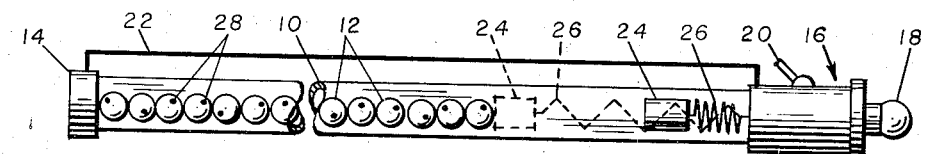
Fig. 1 illustrates one embodiment of the invention device.

Referring to Fig. 1 of the drawing, the demonstrator device of this embodiment comprises a tube 10 of insulated and preferably transparent material containing a number, for example 100, of movable conductive spheres such as metal balls 12. The tube is closed at one end by a metallic contact member 14 and at the other end by a casing 16 containing a battery (not shown), a light bulb 18 screwed into the outer end thereof and electrically connected to the battery, and a switch 20 mounted on the exterior of the casing for opening and closing the circuit to the bulb. The above noted components of the casing are of conventional design and hence are not shown in detail.

An electric lead 22 is connected exteriorly of tube 10 between contact member 14 and the battery within casing 16. An electrically conducting weight 24 is connected by means of a conductive spring 26 to the inner end of casing 16 in series circuit with the bulb 18, the battery, switch and lead 22, the spring loaded weight being provided for a purpose hereinafter more fully described.

The balls 12 are disposed in tube 10 between contact member 14 and contact weight 24. It is thus seen that by placing the demonstrator in a slanted or vertical position with the casing 16 and bulb at the upper end, the balls can contact each other to form an electrical conductor, the contact weight 24 being in engagement with the adjacent ball and its attached spring 26 being in tension under these conditions as shown in dotted lines. Hence, assuming that switch 20 is closed, a closed series circuit is formed consisting of balls 12, contact 14, lead 22, the battery, switch 20, bulb 18, spring 26 and contact weight 24, thus causing the bulb to burn.

Figure 2:
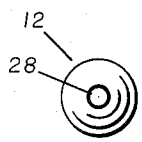
Fig. 2 shows one of the components employed in the device of Fig. 1.

As seen particularly in Fig. 2, each ball 12 has on its surface an insulating spot or dot 28 covering a certain percentage of the surface. If it should happen that any one of the insulation dots should touch an adjacent ball, the flow of electric current in the circuit will be interrupted and the light bulb will not burn, thus indicating "failure" of the whole electric chain of balls, and consequently, for example, of the simulated firing of a missile composed of a number of inter-related components each represented by a ball in tube 10, the ratio of the area of the dot on each ball to the total surface area of the ball representing the known reliability of that component.

By making an insulating dot of a size such that it will cover a certain percentage of the surface of a ball, one can predetermine the probability that this ball will fail in the electric line, thus simulating the probability of failure of a particular component. An insulating spot covering 0.5 percent of the surface of a ball, for example, would simulate a 1 percent probability of failure (because one dot can break the electric circuit between the two adjacent balls), or, in other words, a 99 percent reliability of that ball, or component.

The balls are disposed at random within tube 10 so that the insulating spots are located in various directions from the center of each ball, the tube being somewhat larger in diameter than the balls and longer than the chain of balls when the latter are in contact with each other. Thus, when the demonstrator device of Fig. 1 is turned upside down, that is, with the end containing casing 16 downward, balls 12 will move relative to each other to change the positions of all the balls and their insulation dots in a random manner. Under these conditions the balls will urge contact weight 24 against spring 26, which will thus be compressed, the resulting position of the two latter members being shown in full lines in Fig. 1. Hence, it is seen that these members serve as a cushion against movement of the balls toward that end of the tube containing casing 12. Whenever, after returning the tube to its normal position with contact member 14 in the downward position, and the balls are again in contact with each other, any insulating spot interrupts the electrical chain formed by the balls, the bulb will not burn, indicating failure of the electrical chain of balls, or, in analogy, of the missile.

A demonstration which involves inverting and righting of the tube as described above can be repeated in quick succession so that an audience can witness and directly count out the over-all reliability of a complex automatic series system consisting of $n$ components, each having an individual reliability of $p_i$ percent. One could demonstrate, for example, the over-all reliability of a missile consisting of 100 series components each having a reliability of 99 percent. This would be an example of particular interest because there are many people who consider a 99 percent component reliability a difficult and satisfactory achievement in the field of guided missiles.

Figure 3:
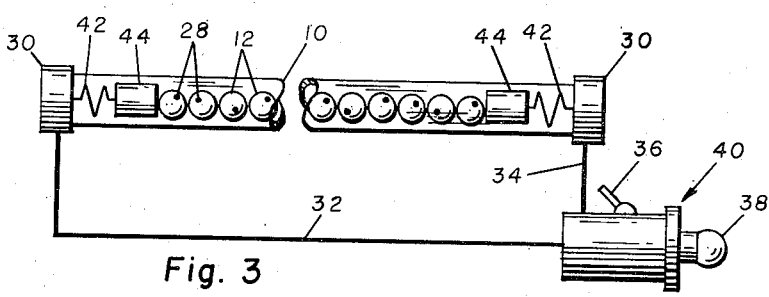
Fig. 3 illustrates another embodiment of the invention device.

Fig. 3 shows a modification of the device of Fig. 1. According to this embodiment the ends of the tube 10 are closed by two contact members 30, both contacts being connected in series by means of leads 32 and 34 to a battery (not shown), a switch 36 and an electric bulb 38 in casing 40. Connected to each of contacts 30 by means of a conductive spring 42 is a contact weight 44, the balls 12 with the insulating dots 28 thereon being positioned between weights 44. According to this embodiment, upon inverting one end of the tube, the balls therein will freely move toward the contact weight at the lower end to compress its adjacently attached spring while the contact weight at the upper end will move downwardly to engage the adjacent ball, the spring attached to the latter weight being placed in tension. The same takes place when the other end of the tube is inverted.

Thus, the provision of two movable contact weights at opposite ends of the tube according to the embodiment of Fig. 3 enables the chain of balls to be placed in electrical contact with the opposite contact weights at each inversion of the tube regardless as to which end is directed downward, making the device operative at each such inversion of the tube. In the device of Fig. 1, however, the chain of balls is only in circuit when the tube is in upright position, since when such tube is inverted with contact member 14 directed upward, the adjacent ball is no longer in engagement with such member, thus opening the circuit under these conditions. Accordingly, two turns of the tube of Fig. 1 are required for each cycle, as compared to only a single turn for the tube of Fig. 3. Further, the device of Fig. 3 provides cushioning means in the form of spring loaded contact weights for movement of the balls toward either end of the tube.

Figure 4:
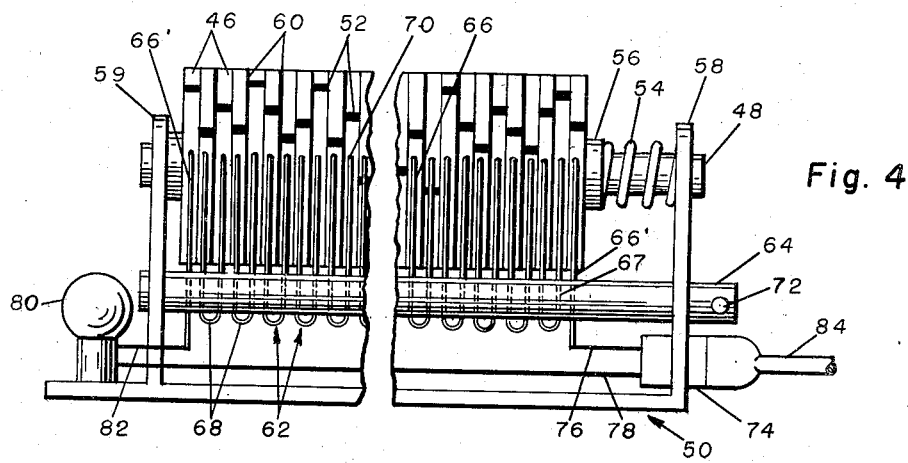
Fig. 4 is a front elevation of still another embodiment of the invention.
Figure 5:
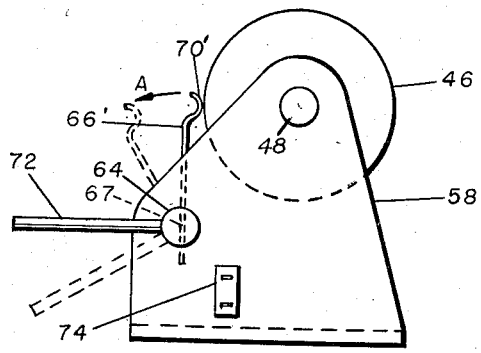
Fig. 5 is an end view of the device shown in Fig. 4.

Referring now to the embodiment of the device shown in Figs. 4 and 5, a number of, for example, 100 metallic disks 46, simulating a corresponding number of interrelated components of an automatic system are loosely strung on an axle 48 so that they can be rotated individually and moved longitudinally along axle 48. The axle is insulated and is supported by a frame 50. Each disk has on its peripheral surface an insulation spot 52, covering, for example, one percent of the circumferential area of the disk, thus simulating one percent probability of failure, or 99 percent reliability of such component. Every two adjacent disks are in electrical contact when the disks are pressed together by a spring 54 disposed about the axle between an insulated stop member 56 mounted for longitudinal movement on the axle adjacent an end disk, and the adjacent end support 58 of the frame. The adjacent pairs of electrically connected disks are insulated by slips of paper 60.

For demonstrating the statistical meaning of the reliability formula $$P_{\text{over-all}} = P_1 \cdot P_2 \cdot P_3 \ldots p_i \ldots p_n$$

all of the disks must, according to the invention, be electrically connected in series. This is achieved by providing a row of contact bridges 62 connected to a second rotatable axle 64 formed of insulating material journaled in the opposite end of supports 58 and 59 of the frame 50. The contact bridges are disposed in alignment along axle 64 and are each composed of a pair of parallel contact arms 66 passing through parallel slots 67 diametrically formed at equal intervals longitudinally along axle 64, each pair of contact arms being joined as at 68 at their lower extremities adjacent such axle. At the upper ends of each of the contact arms is formed a curved brush member 70 adapted to engage the peripheral surface of one of the disks. The contact bridges are arranged along axle 64 so that the brushes on the two contact arms 66 of each contact bridge are respectively adapted to engage or touch two adjacent disks separated by an insulator 60. At opposite ends of the row of contact bridges is a single contact arm 66' having a brush member 70' and connected to axle 64 as above described. The brushes on these arms are adapted to respectively engage the two end disks.

A lever arm 72 is connected to one end of axle 64 normal thereto for rotation thereof. By rotating such lever arm and axle 64 in the direction indicated by arrow A in Fig. 5, all of the brushes on the contact bridges can be moved out of engagement with their respective disks, and by rotating the lever and axle in the opposite direction those brushes can be returned to engagement with such disks as shown in full lines in Fig. 5, thus connecting all the disks electrically in series.

Disposed in end support 58 is an electric socket 74, the socket having connected thereto a lead 76 the opposite end of which is attached to the first contact arm 66', and a lead 78 the opposite end of which is connected to a terminal of an electric bulb 80 in a conventional manner. A lead 82 is connected between the other terminal of the bulb and the last contact arm 66'. A line 84 leading to a source of electrical energy is adapted to be connected to socket 74. A switch (not shown) may be incorporated in the circuit if desired.

According to this embodiment, when all of the contact arms are in engagement with the conducting portions of their respective disks, current will flow from the brush on one contact arm through the disk engaged thereby, into the adjacent contacting disk (not separated from the first disk by an insulator), through the brush on the adjacent contact arm, and so on down the line of contact bridges via adjacent pairs of disks each pair of which is separated by an insulator paper 60. Hence, it is seen that each pair of adjacent contacting disks forms a conductor for passage of current from one contact arm to the adjacent contact arm respectively engaging such disks. Under these conditions current will flow through the series circuit formed by lead 76, contact bridges 62, the conductors formed by the pairs of electrically engaged disks, lead 82, bulb 80 and lead 78; and the bulb will burn.

When one or more of the brushes on the contact arms 66 of the contact bridges engages one or more insulation spots on their respective disks, the flow of current in the circuit is interrupted and the signal lamp 80 will not burn, thus indicating a failure of the entire system. By releasing spring 54, the axial pressure on the disks is relieved so that they can be easily rotated by hand. Thus, all of the 100 insulating spots can be put into a new random position relative to the row of contact bridges and another "firing" can be simulated. The trials can be repeated often and in quick succession. By comparing the number of "successes" (i. e. no current interruption) with the total number of trials, the over-all reliability of the entire system can be demonstrated.

Any other system or combination as to number of components and individual component reliabilities can be chosen and demonstrated by changing the number of balls or disks in the above embodiments and by varying the sizes of insulating spots thereon. It is also possible to demonstrate the statistical results of a series of components, the reliabilities of which vary from component to component as in the case with real missiles, by varying the sizes of the dots from component to component.

From the foregoing, it is seen that the invention provides a simply constructed, inexpensive and comparatively rugged device for demonstrating mathematical probability and reliability. The novel apparatus afforded by the invention is particularly adapted for visually demonstrating the probability of success or failure of a complex automatic system such as a guided missile, composed of a large number of interrelated components, e. g. mechanical, electrical and/or electronic, each having a known mathematical reliability.

Obviously many modifications and variations of the present invention are possible in the light of the above teachings. It is therefore to be understood that within the scope of the appended claims the invention may be practiced otherwise than as specifically described.

I claim:

1. A device for demonstrating mathematical probability which comprises a tubular housing, a plurality of electrically conductive movable elements in the form of spheres disposed adjacent each other within said housing, a nonconductive portion on the surface of said elements, means for juxtapositioning said elements, means for electrically connecting said elements in series to form an electrical conductor, the nonconductive portions on said elements being operative on rearrangement thereof to inactivate said conductor and interrupt a flow of electrical energy through said elements, a source of electrical energy connected in circuit with said elements, and an electrical indicating means connected in series in said circuit to indicate when said elements have been so arranged as to form an operative electrical conductor.

2. A device for demonstrating mathematical probability which comprises a plurality of electrically conductive elements in the form of cylinders mounted adjacent each other for rotatable movement on a common axis, a nonconductive portion on the cylindrical surface of each of said elements, means for juxtapositioning said elements, means for electrically connecting said elements in series to form an electrical conductor, the nonconductive portions on said elements being operative on rearrangement thereof in cooperation with said last named means to inactivate said conductor and interrupt a flow of electrical energy through said elements, a source of electrical energy connected in circuit with said elements, and an electrical indicating means connected in series in said circuit to indicate when said elements have been so arranged as to form an operative electrical conductor.

3. A device for demonstrating mathematical probability which comprises an elongated cylindrical container, a plurality of electrically conductive spherical members disposed therein, means to force each of said members into contract with the adjacent member so as to form an electrical conductor, a source of electric energy in circuit with said conductor, electrical indicating means connected in series in said circuit, a predetermined portion of the surface of each of said spherical members being insulated whereby the flow of electrical energy through said conductor can be interrupted and such condition indicated by said indicating means when one of said members is arranged to contact the insulated portion of an adjacent member, the diameters of said members being less than the diameter of said container for indiscriminate rearrangement of said members with respect to one another.

4. A device for demonstrating the mathematical probability and reliability of an automatic system composed of a plurality of individual components each having a known reliability, which comprises an elongated transparent cylindrical container, a plurality of electrically conductive spherical members disposed therein, means including a conductive weight to force each of said members into contact with the adjacent member so as to form a unitary electrical conductor, a source of electrical energy in circuit with said conductor, visual electrical indicating means connected in series in said circuit, a predetermined portion of the surface of each of said spherical members being insulated whereby the flow of electrical energy through said conductor can be interrupted and such condition indicated by said indicating means when one of said members is arranged to contact the insulated portion of an adjacent member, the diameters of said members being less than the diameter of said container whereby said members and insulating portions can be rearranged at random with respect to one another by chance upon inversion of said container, and means to inactivate said circuit.

5. A device for demonstrating the mathematical probability and reliability of an automatic system composed of a plurality of individual components each having a known reliability which comprises a plurality of electrically conductive disks mounted adjacent each other for rotatable movement on a common axis, a plurality of insulators each disposed between a pair of adjacent disks and forming a plurality of individual conductors each consisting of a pair of electrically contacting disks between two insulators, spring means urging said disks and insulators into frictional engagement, a plurality of movable contacts adapted to engage the periphery of each of said disks for connecting them in series to form a single unitary conductor, the adjacent contacts which are respectively adapted to engage a pair of disks separated by an insulator being electrically connected, a source of electrical energy in circuit with said unitary conductor and visual electrical indicating means connected in series in said circuit, a predetermined portion of the peripheral surface of each of said disks being insulated whereby the flow of electrical energy through said last named conductor can be interrupted and such condition indicated by said indicating means when one of said movable contacts is arranged to engage the insulated portion of a corresponding disk, said disks and insulating portions being capable of rearrangement at random with respect to one another by chance upon rotation of said disks.

6. A device for demonstrating mathematical probability which comprises a plurality of electrically conductive disks mounted adjacent each other for rotatable movement on a common axis, insulating means separating some of said disks and forming a number of separate conductors, said conductors consisting of at least two of said disks in contact with each other, means contacting each of said conductors for connecting them in series to form a single unitary conductor, a source of electrical energy in circuit with said unitary conductor and electrical indicating means connected in series in said circuit, a predetermined portion of the peripheral surface of each of said disks being insulated whereby the flow of electrical energy through said last named conductor can be interrupted and such condition indicated by said indicating means when said contacting means is arranged to engage the insulated portion of a disk.

7. A device for demonstrating mathematical probability which comprises a group of elements each of which is movable with respect to all remaining elements, each element being composed of electrically-conductive material except that a predetermined unitary area constituting a minor fraction of the surface of at least some of said elements is of a non-conducting nature, and an electrical circuit including each of said elements, said circuit being completed through at least one contact with the conducting surface of each of said elements, whereby upon movement of said elements to result in a random rearrangement thereof, said circuit will be broken when the contact with any one or more of said elements lies within a non-conducting surface area.

8. A device according to claim 7, in which the number of elements employed is related to the number of components present in a combination the reliability of which is to be demonstrated, and in which the non-conducting surface area of any particular element is chosen in accordance with the mathematical probability of operating failure of that component represented by such particular element.

9. A device according to claim 7, further including means forming part of said circuit for indicating to an observer whether or not the circuit is broken following a random rearrangement of said elements.

10. A demonstration device which comprises a plurality of electrically-conducting elements adapted for random juxtaposition, each of said elements representing one particular component of a combination the reliability of which is to be demonstrated, with the surface of each element having a unitary non-conducting portion the area of which is representative of the probability of failure of that particular component of the combination represented by such element, and an electrical circuit normally including a conductive path through each element from at least one contact point on the surface thereof, said circuit being broken when such contact point on the surface of at least one of said elements falls within the said non-conducting portion thereof following a random juxtapositioning of said elements.

References Cited in the file of this patent

UNITED STATES PATENTS

| | | |
|---|---|---|
| 2,295,968 | Poole | Sept. 15, 1942 |
| 2,479,482 | Edler | Aug. 16, 1949 |